United States Patent [19]

Ohta et al.

[11] Patent Number: 5,031,871
[45] Date of Patent: Jul. 16, 1991

[54] OUTSIDE MIRROR ASSEMBLY FOR MOTOR VEHICLES

[75] Inventors: Michio Ohta, Chigasaki; Hideharu Naganuma, Atsugi, both of Japan

[73] Assignee: Ichikoh Industries, Ltd., Tokyo, Japan

[21] Appl. No.: 446,551

[22] Filed: Dec. 6, 1989

[30] Foreign Application Priority Data

Dec. 6, 1988 [JP] Japan .................. 63-158082[U]
Dec. 6, 1988 [JP] Japan .................. 63-158083[U]

[51] Int. Cl.$^5$ ............................................. B60R 1/06
[52] U.S. Cl. ........................................ 248/544; 248/487
[58] Field of Search ............ 248/544, 479, 480, 481, 248/485, 486, 487; 350/632, 636, 639

[56] References Cited

U.S. PATENT DOCUMENTS

| Re. 27,172 | 9/1971 | Van Noord | 248/487 |
| 3,976,275 | 8/1976 | Clark | 248/487 |
| 3,981,474 | 9/1976 | Szilagyi | 248/487 |
| 4,701,037 | 10/1987 | Bramer | 248/481 |
| 4,863,255 | 9/1989 | Seitz | 248/479 |

FOREIGN PATENT DOCUMENTS

| 2399786 | 4/1979 | France | 248/544 |
| 57-43705 | 9/1982 | Japan | |
| 1096462 | 12/1967 | United Kingdom | 248/481 |

*Primary Examiner*—Ramon O. Ramirez
*Assistant Examiner*—Robert A. Olson
*Attorney, Agent, or Firm*—Foley & Lardner

[57] ABSTRACT

In an outside mirror assembly for motor vehicles, having a mirror installed pivotably inside an enclosure fixed to a stay, the retaining force of a structure pivotably holding the mirror can be adjusted and the mirror can be detached and reinstalled. The holding structure can be removably installed by means of a fixture inside the enclosure fixed to the stay. A back plate holding the mirror is pivotably supported to the holding structure, and the force of the holding structure for retaining the back plate can be adjusted. The enclosure has formed therein an opening through which a tool for adjusting the retaining force of the holding structure and for removing or reinstalling the fixture can be introduced, and a cover is removably attached to the enclosure to close said opening.

4 Claims, 4 Drawing Sheets

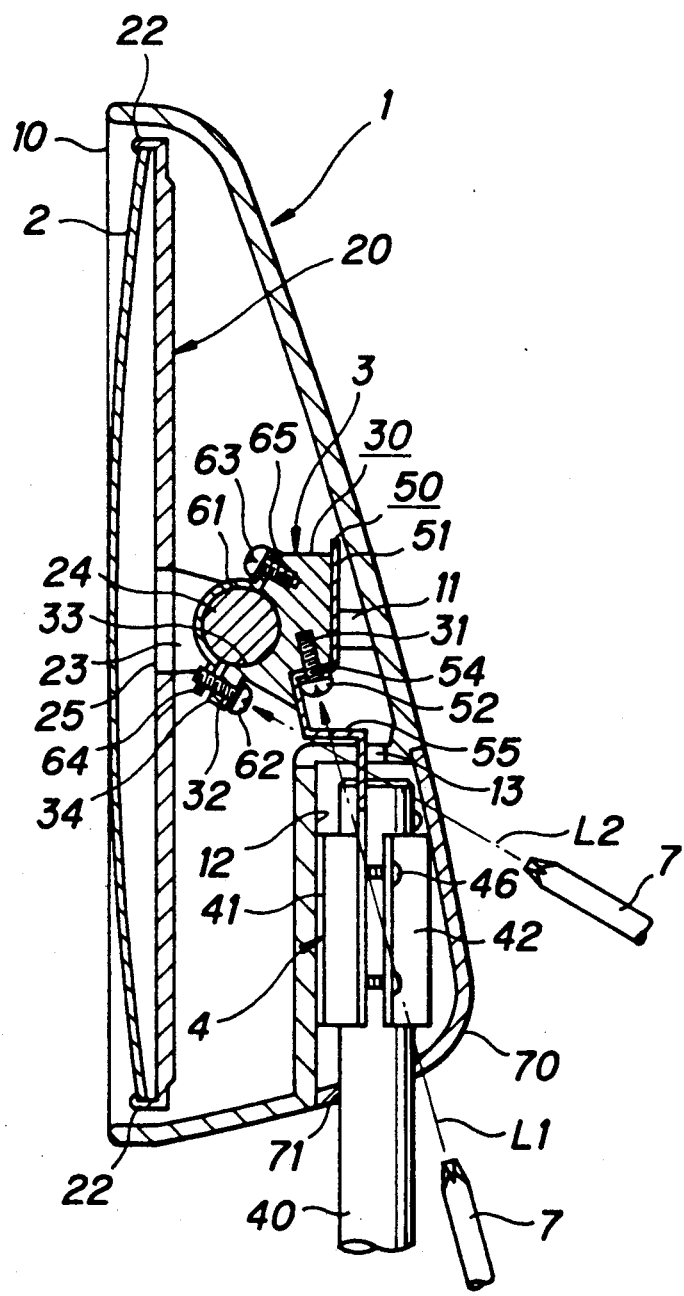

OUTSIDE MIRROR ASSEMBLY FOR MOTOR VEHICLES

BACKGROUND OF THE INVENTION (a) Field of the Invention

The present invention relates to an outside mirror assembly for motor vehicles, and more particularly to an outside mirror assembly for motor vehicles, of which the mirror is installed pivotably (for adjustment of the mirror posture) inside the enclosure which is fixed to a stay.

(b) Description of the Prior Art

The outside mirror assembly of this type is known from the disclosure in the Japanese Examined Utility Model Publication No. Sho 57-43705 published on Sept. 27, 1982.

The conventional outside mirror assembly for motor vehicles will be explained herebelow with reference to FIG. 1.

In FIG. 1, the reference numeral 100 indicates a front-open enclosure. An annular seat 101 is formed in the vicinity of the center inside the enclosure 100. A shaft 102 is fixed as erected nearly at the center inside the enclosure 100 and passes through the center of the annular shaft 102. The enclosure 100 has formed at the lower portion thereof a boss 103 in which a fixing member 105 with a screw hole 104 is provided as planted.

The reference numeral 201 indicates a mirror holder or back plate housed in the enclosure 100. The back plate 201 has formed in the center thereof and integrally therewith a semispherical portion 203 projecting rearward and which abuts the annular seat 101. There is provided in the center of this semispherical portion 203 a through hole 204 through which the shaft 102 penetrates.

The reference numeral 300 indicates a semispherical holder, 301 a coil spring and 302 a spring retainer. The spherical holder 300, coil spring 301 and spring retainer 302 are fitted on the shaft 102. The spring retainer 302 is engaged on the shaft 102. Thus, the back plate 201 is installed pivotably about the annular seat 101 and semispherical holder 300.

The reference numeral 303 indicates a coil spring for supporting the mirror and 304 a spring retainer. The coil spring 303 and spring retainer 304 are interposed between the back plate 201 and a mirror 200 which will be described later.

The reference numeral 200 indicates a mirror and 202 a annular rim or ring. The mirror 200 is held on the back plate 201 by means of the ring 202. Namely, after the back plate 201 is installed to the enclosure 100, the coil spring 303, spring retainer 304 and mirror 200 are placed in this order in front of the back plate 304 and then the ring 202 is placed along the front circumferential edge of the back plate 201. The circumferential edge of the back plate 201 is thermally calked so that the mirror 200 is held by the back plate 201 and installed pivotably inside the enclosure 100 by means of the back plate 201.

The reference numeral 400 indicates a stay of which the base end is to be fixed to the body of a vehicle. The free end of the stay 400 is threaded as indicated at 401. A lock nut 402 is screwed on the thread portion 401. The enclosure 100 is installed to the stay 400 by screwing the thread portion 401 of the stay 400 into the screw hole 104 in the enclosure 100.

In case of the outside mirror assembly for motor vehicles of the above-mentioned type, the mirror 200 and back plate 201 are pivotably installed inside the enclosure 100, that is, in such a manner that their posture can be adjusted. So, even when the mirror 200 and back plate 201 is blown with a strong wind or struck with any object, the tilt angle of the mirror 200 will not be abruptly changed or the mirror not broken. Also since the mirror holding structure (comprising the annular seat 101 of the housing 100, shaft 102, semispherical portion 203 of the back plate 201, spring holder 300, coil spring 301, spring retainer 302, etc.) installing the mirror 200 and back plate 201 pivotably inside the enclosure 100 is housed in a space defined by the enclosure 100, mirror 200 and back plate 201, even if the mirror holding structure is hit by a human body or the like, it will hurt the human body as little as possible.

In the aforementioned conventional outside mirror assembly, however, since the mirror 200 and back plate 201 are housed in the enclosure 200 and the mirror holding structure for installing the mirror 200 and back plate 201 pivotably is housed in a space defined by the enclosure 100, mirror 200 and back plate 201, the retaining force of the mirror holding structure (force of the coil spring 301) holding the mirror 200 and back plate 201 cannot be pivotally adjusted and the mirror 200 and back plate 201 cannot be detached and reinstalled.

SUMMARY OF THE INVENTION

The present invention has an object to provide an outside mirror assembly for motor vehicles, in which the retaining force of the structure holding the mirror pivotably can be adjusted and the mirror itself can be detached and reinstalled.

The above object can be attained by providing an outside mirror assembly for motor vehicles, in which a front-open enclosure is mounted on a stay, a holding structure of which the retaining force can be adjusted is removably installed inside the enclosure by means of a fixture, a back plate holding a mirror is pivotably supported to the holding structure so that the mirror and back plate are held pivotably inside the enclosure, there is formed in the enclosure a tool insertion opening in a direction in which the retaining force of the holding structure is adjusted and the tool is inserted or removed, and a cover is removably attached on the enclosure to close the tool insertion opening.

In the outside mirror assembly for motor vehicles according to the present invention, even after the mirror is assembled, the retaining force of the holding structure pivotably holding the mirror and back plate can be adjusted by using a tool inserted through the tool insertion opening found with the cover detached from the housing. This owes to the afore-mentioned construction of the mirror assembly according to the present invention. Also, when the holding structure is detached from the fixture, the holding structure, back plate and mirror can be taken off from the enclosure. Reversely, with the holding structure attached to the fixture, the holding structure, back plate and mirror can be reattached to the housing.

The present invention has another object which is to provide an outside mirror assembly for motor vehicles, in which the housing is attached to a stay like a round bar and the holding structure is composed of a shaft member perpendicular to the axis of the stay and a bearing member holding the shaft member pivotably, thereby permitting minimization of any fine vibration propagated to the mirror from the vehicle body.

The present invention has still another object to provide an outside mirror assembly for motor vehicles in which the fixing plate of the fixture to fix the holding structure to the enclosure and the fixing plate to fix the enclosure to the stay are formed integrally with each other, whereby the number of parts of the mirror assembly can be reduced.

BRIEF DESCRIPTION OF THE DRAWINGS

FIG. 2 being an axial sectional view, FIG. 3 a sectional view taken along the line III—III in FIG. 2 and FIG. 4 a sectional view taken along the line IV—IV in FIG. 2; and FIG. 5 is an axial sectional view showing another embodiment of the outside mirror assembly for motor vehicles.

DETAILED DESCRIPTION OF THE PREFERRED EMBODIMENTS

Figure 2:
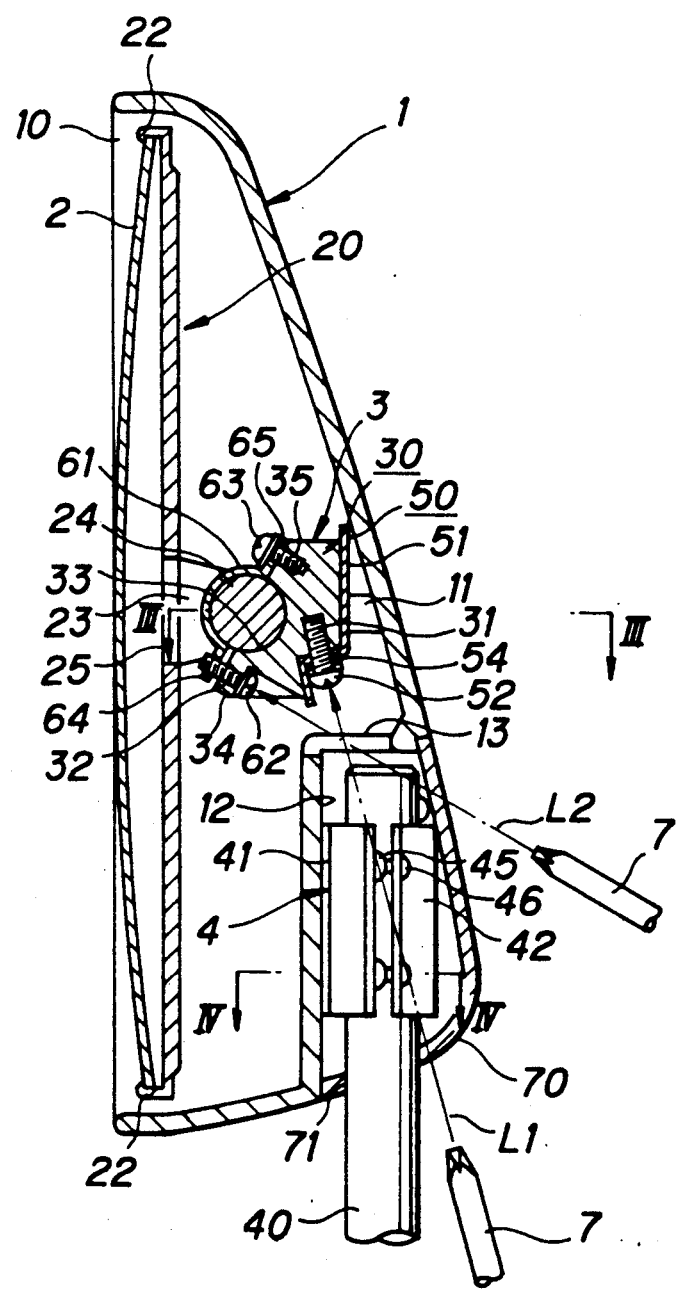
FIGS. 2 to 4 show one embodiment of the outside mirror assembly for motor vehicles according to the present invention.
Figure 3:
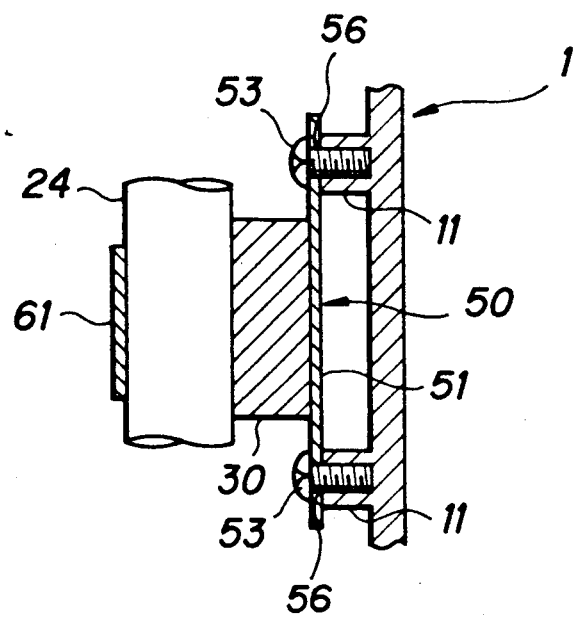
Figure 4:
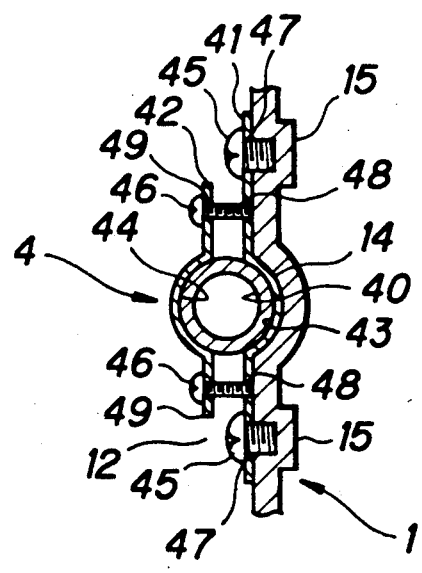

Referring now to FIGS. 2 to 4, the first embodiment of the outside mirror assembly according to the present invention will be described herebelow.

Figure 1:
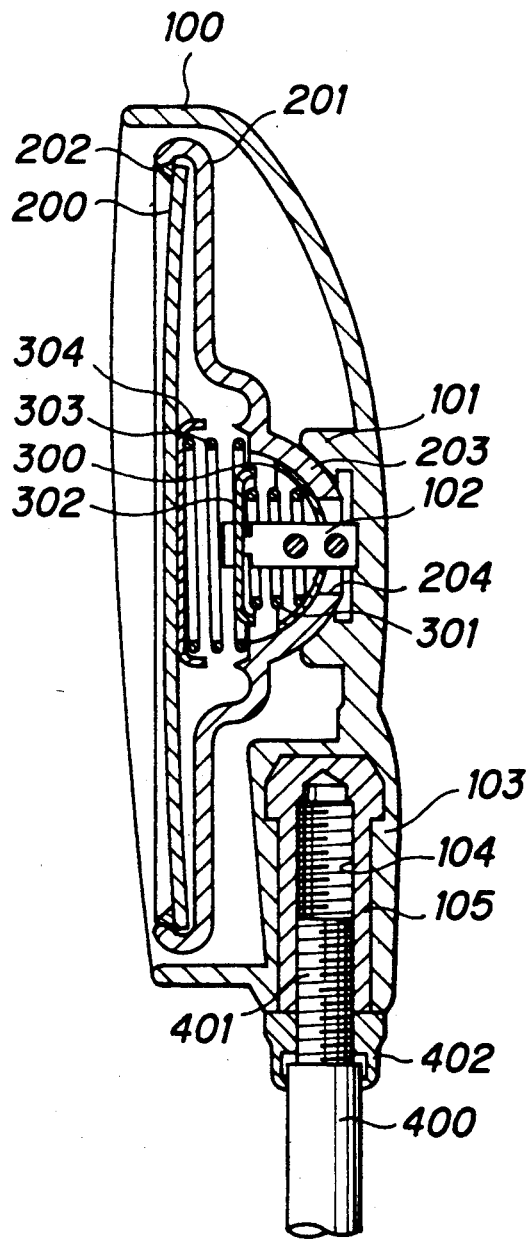
FIG. 1 is an axial sectional view of a conventional outside mirror assembly.

In FIGS. 2-4, the reference numeral 1 indicates an enclosure of which the front is open as shown in FIG. 1. A boss 11 is formed integrally with the enclosure 1 as projected in the vicinity of the center of the enclosure inside surface. The enclosure 1 has provided at the lower rear portion thereof a concavity 12 as formed by undercutting. The concavity 12 has formed in the upper horizontal wall a tool insertion opening 13 through which a tool 7 is to be introduced. The opening 13 is formed at a location aligned with the direction L1 in which a screw 52 for a fixture 50, which will be described later, is installed or removed and with the direction L2 in which the a screw 62 for a holding structure 3 is tightened or loosened, that is, in the center of the horizontal wall of the concavity 12. A semispherical recess 14 is vertically formed in the vertical wall of the concavity 12. A boss 15 is integrally formed inside the enclosure 1 at either side of the recess 14.

The reference numeral 40 is a stay like a round bar (round pipe) at the free (top) end of which the enclosure 1 is installed pivotably about the axis of the stay 40 by means of the fixing member 4.

The fixing member 4 is composed of two steel-made mount plates 41 and 42 (first and second) as shown in FIGS. 2 and 4. A semispherical concavity 43 (44) is formed in the center of the first (second) fixing plate 41 (42). A large-diameter through hole 47 and a small-diameter screw hole 48 are formed at either side of the concavity 43 in the first fixing plate 41. On the other hand, a through hole 49 is formed in either side of the concavity 44 in the second fixing plate 42 correspondingly to the screw hole 48. The concavity 43 in the first fixing plate 41 is fitted in the recess 14 in the enclosure 1 and a screw 45 is screwed into the boss 15 in the enclosure 1 through the through hole 47 in the first fixing plate 41, thereby fixing the first fixing plate 41 in the concavity 12 in the enclosure 1. By fitting the stay 40 into the recess 43 in the first fixing plate 41, attaching the concave portion 44 of the second fixing plate 43 onto the stay 40 and screwing the screw 46 into the screw hole 46 in the first fixing plate 41 through the through hole 49 in the second fixing plate 42, the first fixing plate 42 is fixed to the first fixing plate 41 and enclosure 1 and at the same time the stay 40 is held as sandwiched between the first and second mount plates 41 and 42. Thus, the enclosure 1 is installed to the stay 40 pivotably about the axis of thereof by means of the fixing member 4.

The reference numeral 50 indicates a fixture to install removably inside the enclosure 1 a holding structure 3 which will be described later. This fixture 50 is composed of a fixing plate 51 being a plate of which the opposite ends are bent nearly right angle counterclockwise, respectively, and a fixing screw 52. There is provided in the proximity of the center of the fixing plate 51 a through hole 54 through which the screw 52 is introduced. A through hole 56 is formed at either side of one end (top end) of the fixing plate 51. By introducing and tightening the screw 53 into the boss 11 of the enclosure 1 through the through hole 56 in the fixing plate 51, the fixing plate 51 is fixed to the enclosure.

The reference numeral 3 indicates a holding structure which holds the mirror 2 and back plate 20 pivotably inside the enclosure 1. As will be seen from FIGS. 2 and 3, the holding structure 3 comprises a shaft member 24 formed integrally with the back plate 20 which will be described later in a direction perpendicular to the axial direction of the stay 40, a bearing member 30, a clamping plate 61 which clamps the bearing member 30 to the shaft member 24 pivotably and so that the clamping force can be adjusted, and a screw 62.

The bearing member 30 takes the form of a block as shown in FIGS. 2 and 3 and has a spherical concavity 33 formed horizontally in the front side thereof. The bearing member 30 has formed at the lower rear portion thereof a stepped portion under which a screw hole 31 is formed. There is formed integrally on the lower front portion of the bearing member 30 a fixing piece 34 in which a through hole 32 is formed. A screw hole 35 is formed in the upper front portion of the bearing member 30. The screw hole 31 and through hole 32 are formed in such directions that when installing or detaching the bearing member 30 to the fixing plate 51 of the fixture 50 or when adjusting the force of clamping, the tool 7 such as a screwdriver can be introduced from the tool insertion opening 13 into the enclosure 1 to tighten or loosen the screw 52 in the fixture 50 and the screw 62 in the holding structure 3.

By mounting the bearing member 30 on the fixing plate 51 of the fixture 50 and tightening the screw 52 into the screw hole 31 in the bearing member 30 through the through hole 54 in the fixing plate 51, the bearing member 30 can be removably attached to the fixing plate 51 of the fixture 50.

As shown in FIGS. 2 and 3, the clamping plate 61 is made of a steel plate, and has the central portion thereof formed as a semisphere corresponding to the concavity 33 of the bearing member 30. It has also a screw hole 64 formed in one end thereof (bottom end) and a through hole in the other end (top end) thereof.

By setting the shaft member 24 of the back plate 20 (which will be described later) into the concavity 33 in the bearing member 30, fitting the curved concave portion of the clamping plate 61 onto the shaft member 24, screwing the screw 63 into the screw hole 35 in the bearing member 30 through the through hole 65 in the clamping plate 61 and also the screw 62 into the screw hole 64 in the clamping plate 61 through the through hole 34 in the bearing member 30, the mirror 2 which will be described later and back plate 20 are held by the holding structure 3 pivotably and so that the clamping force (force of retention) can be adjusted.

The reference numeral 20 indicates a back plate having a thin engagement member 22 along the entire circumferential edge of the back plate 20. There is formed integrally with the back plate 20 a shaft member 24 in the proximity of the center of the rear side thereof by means of a rising piece 23 in a direction perpendicular to the axis of the stay 40. Note that the reference numeral 25 indicates an opening for extracting the mold for the above-mentioned shaft member 24.

The reference numeral 2 indicates a mirror which is a convex mirror slightly projecting to the front as shown in FIG. 2. The mirror 2 is engaged along the entire circumferential edge thereof inside the retaining edge 22 of the back plate 20. Thus, the mirror 2 is held by the back plate 20.

The reference numeral 70 indicates a cover covering the concavity 12 in the enclosure 1, namely, the opening 12 and fixing member 4 (which fixes the housing 1 to the stay 40). This cover 70 has formed in the lower portion thereof a through hole 71 through which the stay 40 is penetrated. The cover 70 and the concavity 12 of the enclosure 1 are so formed along the respective circumferential edges thereof as to be fitted to each other (not shown).

By holding the shaft member 24 of the back plate 20 pivotably on the bearing member 30 of the holding structure 3 by means of the clamping plate 61 and screws 62 and 63 and installing removably the bearing member 30 to the fixing plate 51 of the fixture 50 by means of the screw 52, the mirror 2 and back plate 20 are so held inside the enclosure 1 by means of the holding structure 3 as to be pivotably and so that retaining force (force of retention) can be adjusted.

Since the outside mirror assembly for motor vehicles according to the present invention is constructed as having been described in the foregoing, even after the mirror 2 is assembled, the force to clamp the clamping plate 61 to the bearing member 30 and shaft member 24, that is, the force for pivoting vertically the mirror 2 about the shaft member 24, can be adjusted by detaching the cover 70 from the concavity 12 of the enclosure 1, introducing the tool 7 into the enclosure 1 through the opening 12 as shown with the arrow L1 in FIG. 2 and tightening or loosening the screw 62 in the holding structure 1. Also, by introducing the tool 7 into the enclosure 1 through the opening 13 as shown with the arrow L1 in FIG. 2 and loosening the screw 52 in the fixture 50 to detach the fixture 50 from the enclosure 1, the mirror 2 and back plate 20 can be removed along with the holding structure 3 from the enclosure 1. Reversely, by screwing the screw 52 into the bearing member 30, the mirror 2 and back plate 20 can be fixed to the enclosure 1 by means of the holding structure 3.

Especially in this embodiment, the stay 40 is formed like a round bar. The enclosure 1 is installed on the stay 40 while the holding structure 3 is composed of the shaft member 24 perpendicular to the axis of the stay 40 and the bearing member 30 which pivotably holds the shaft member 24. Thus, the fine vibration propagated from the vehicle to the mirror can be minimized as compared with the outside mirror assembly for motor vehicles of which the mirror is installed to the enclosure by means of a ball joint.

Also in this embodiment, the cover 70 can cover the opening 13 and the portion of the housing 1 installed to the stay 40 (fixing member 4) so that even if the fixing member 4 is hit by the human body or the like, it will hurt it little.

FIG. 5 is an axial sectional view showing the second embodiment of the outside mirror assembly for motor vehicles according to the present invention.

In this Figure, the same reference numerals as in FIGS. 1 to 3 indicate the same elements as in FIGS. 1 to 3.

In this embodiment, the fixing plate 51 of the fixture 50 and the first fixing plate 41 of the stay fixing member 4 are made as an integral structure by using a liaison member 55.

Thus, the number of parts such as fixing plate and screw can be reduced and also the number of manufacturing steps can be reduced.

What is claimed is:

1. An outside mirror assembly for motor vehicles comprising:
    a round bar stay having a first end and a second end, said second end being fixably attached to a vehicle;
    a front-open enclosure having fixture means for pivotably connecting said enclosure to said first end of said stay;
    a back plate housed in said enclosure, a mirror affixed to said back plate;
    a holding structure for holding said back plate pivotably inside said enclosure, said holding structure comprising a shaft member positioned perpendicular to said stay, a clamping plate having first and second ends and a screw hole disposed in said second end, a screw disposed in said screw hole for pivotably clamping said clamping plate to said shaft member such that by tightening or loosening said screw, a clamping force becomes adjustable and said mirror is pivotable about a vertical axis of said shaft member;
    a fixture for removably attaching said holding structure inside said enclosure, said fixture comprising a fixing plate having a through hole formed in a central portion thereof, a screw disposed in said through hole for affixing said fixing plate to said holding structure such that said holding structure pivotably supports said mirror and back plate within said enclosure, thereby creating an adjustable retaining force;
    said enclosure having an opening formed therein for receiving a tool for adjusting said retaining force of said holding structure and installing or detaching said fixture; and
    a cover removably attached to said enclosure, including means for covering said opening in said enclosure and a housing portion affixed to said stay.

2. An outside mirror assembly according to claim 1, wherein said fixture means for pivotably attaching said enclosure to said stay and said fixing plate of said fixture form an integral structure.

3. An outside mirror assembly according to claim 1, wherein said cover has a hole in a lower portion thereof for receiving said stay.

4. An outside mirror assembly for motor vehicles comprising:
    a stay having a first end and a second end, said second end being fixably attached to a vehicle;

a front-open enclosure having fixture means for pivotably connecting said enclosure to said first end of said stay;

a back plate housed in said enclosure, a mirror affixed to said back plate;

a holding structure for holding said back plate pivotably inside said enclosure, said holding structure comprising a shaft member positioned perpendicular to said stay, a clamping plate having screw holes disposed in opposite ends thereof, screws disposed in said screw holes for pivotably clamping said clamping plate to said shaft member such that by tightening or loosing said screws a clamping force becomes adjustable and said mirror is pivotable about a vertical axis of said shaft member;

a fixture for removably attaching said holding structure inside said enclosure, said fixture comprising a fixing plate having a first through hole formed in a central portion thereof and a second through hole formed in a first end thereof, a tightening screw disposed in said second through hole for affixing said fixing plate to said enclosure, a screw disposed in said first through hole for affixing said fixing plate to said holding structure such that said holding structure pivotably supports said mirror and back plate within said enclosure, thereby creating an adjustable retaining force;

said enclosure having an opening formed therein for receiving a tool for adjusting said retaining force of said holding structure and installing or detaching said fixture; and a cover removably attached to said enclosure, including means for covering said opening in said enclosure and a housing portion affixed to said stay.

* * * * *